United States Patent [19]

Biard et al.

[11] Patent Number: 4,751,841
[45] Date of Patent: Jun. 21, 1988

[54] LIQUID IMPOUNDMENT LEAK RATE DETECTOR

[75] Inventors: James C. Biard, San Antonio; Thomas E. Owen, Helotes, both of Tex.

[73] Assignee: Southwest Research Institute, San Antonio, Tex.

[21] Appl. No.: 32,781

[22] Filed: Mar. 31, 1987

[51] Int. Cl.$^4$ .............................................. G01M 3/26
[52] U.S. Cl. .................................... 73/49.2; 73/40
[58] Field of Search ................ 73/49.2, 304 C, 304 R, 73/40

[56] References Cited

U.S. PATENT DOCUMENTS

| | | | |
|---|---|---|---|
| 3,050,999 | 8/1962 | Edwards | 73/304 C |
| 3,460,386 | 8/1969 | Guignard | 73/321 X |
| 3,538,746 | 11/1970 | Jacobs et al. | 73/49.2 |
| 3,889,523 | 6/1985 | Nolte | 73/49.2 |
| 4,115,877 | 9/1978 | Wall | 73/304 C |
| 4,646,560 | 3/1987 | Meresca, Jr. et al. | 73/299 |

Primary Examiner—Stewart J. Levy
Assistant Examiner—Hezron E. Williams
Attorney, Agent, or Firm—Gunn, Lee & Jackson

[57] ABSTRACT

For use in determing the rate of loss of liquid from an impoundment, the loss being through a leak in the impoundment and further making such measurements in the presence of surface losses due to evaporation, an apparatus is set forth which includes first and second open ended columns for receiving the impounded liquid therein. The first column is isolated while the second column is communicated near the bottom thereof with a passage into the impoundment so that its height will fall with the height of liquid in the impoundment. A measuring means is interposed betwen the two columns to measure differences in height. The two columns are equipped with baffles to suppress column height agitation. The measuring means comprises first and second communicated respectively with the first and second columns, said chambers being filled with first and second liquids which are not miscible, which differ in dielectric constant, and have different densities. A two liquid interface between the liquid is defined and variations in the location of the two liquid interface indicate variation in column height between the two columns.

16 Claims, 1 Drawing Sheet 4,751,841

LIQUID IMPOUNDMENT LEAK RATE DETECTOR

FIELD OF THE INVENTION

This invention is directed to a leak rate detector particularly for use in a liquid impoundment. It utilizes isolated chambers of two dissimilar liquids which fill an electrical capacitance sensor element. The capacitor responds to the dissimilar liquid dielectric coefficients, thereby changing capacitance. The device determines the change in level of a liquid storage reservoir by relative movement of the two dissimilar liquids in the capacitor.

BACKGROUND OF THE INVENTION

The present apparatus is directed to a device which determines the rate of leakage from a liquid impoundment. This apparatus in particular can be used to determine if liquid is being lost out of the liquid impoundment to the surrounding ground. As a matter of background, it is useful in a liquid impoundment which is formed by scooping out a shallow lake or pond and it is particularly noted that this impoundment may or may not be lined with one or more layers of a geomembrane intended to retain such impounded liquids. The impoundment is filled with some liquid. Normally, it is a liquid where leakage is considered highly undesirable. It is very difficult to know whether or not leaking is occurring. One way to know this is to measure and monitor the liquid mass balance between all known inputs and outputs from the impoundment. This is a difficult procedure. The present apparatus enables the determination of whether or not the reservoir is losing liquid, this liquid loss being isolated from liquid losses as a result of surface evaporation. Thus, the present apparatus can be used to determine, if in the first instance, there is a liquid loss to the ground.

Loss of liquid from a liquid impoundment is difficult to know and calculate by virtue of the fact that the bulk of the loss typically will occur through evaporation. If the liquid is water based, vapor losses through the surface can be quite extensive. Evaporation can be many times greater than the leakage lost by the seepage into the ground. Even if it is a hydrocarbon liquid, there is still some loss due to evaporation. The present apparatus is a system which includes two separate columns of liquid to expose them to equal surface losses through evaporation. Yet, one of the columns is isolated from the other so that it will lose liquid at a different rate should there be another form of liquid loss in the impoundment. The present apparatus thus provides an indication that the impounded liquid is leaking into the supportive soil. This apparatus is thus very useful in separating the liquid leakage to the ground from the loss due to evaporation from the surface, and by monitoring such leakage versus time, provides information on the rate of such liquid lost to the ground.

SUMMARY OF THE INVENTION

The disclosed apparatus is useful in measuring liquid loss from an impoundment which contains either water for storage purposes or contains toxic or otherwise dangerous chemicals. Although the invention may be practiced on an impoundment which does not use a geomembrane liner, it is equally applicable to the determination of liquid leakage rates in impoundments which do utilize a leak reducing geomembrane. It includes first and second isolated liquid coumns. They are equipped with baffles at intermediate points to still the liquid columns, thereby suppressing any liquid motions and surface wave action. One column is totally isolated from the impoundment. The second column is connected to the impoundment by means of a small subsurface flow pipe so that its level will follow the liquid level in the impoundment. The second column falls at a rate equal to that of the first column if both suffer only surface losses. However, the second column will fall faster if there is a non-evaporative liquid loss from the impoundment. The minute changes in column height are measured by use of two isolated liquids which form an interface in a cylindrical capacitor. The liquids are chosen to have different dielectric constants, thereby indicating a change in capacitance with a change in interface location.

DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
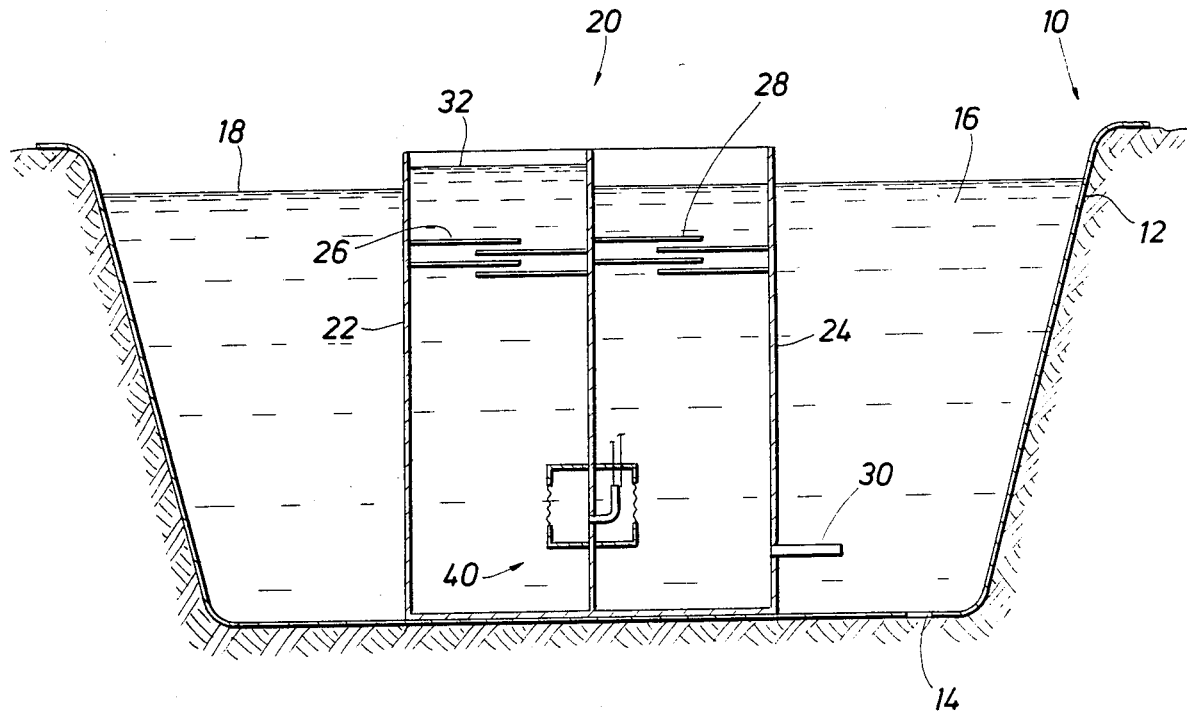
FIG. 1 shows the leak detecting system of the present disclosure installed in a liquid impoundment subject to having a leak therein.

Attention is first directed to FIG. 1 of the drawings where a liquid impoundment is identified by the numeral 10. This impoundment may be defined by a sheet geomembrane 12 spread over the supportive soil, but it should be understood that the present invention may easily be practiced on impoundments having no geomembrane. In such a case, the surrounding earth is intended to be non-pourous, but a permeable channel may have developed therein. The geomembrane 12 is included for purposes of definitively illustrating the presence of a leak. The geomembrane 12 is shown to have a leak 14, which drains the liquid 16 out of the impoundment. The impoundment additionally has a surface 18 subject to evaporation loss. The size of the impoundment can vary widely up to several hundred acres. Typically, the depth also can vary. It is scooped out, typically with earth moving equipment, and is shaped to define the surrounding peripheral embankment covered by the geomembrane 12. The geomembrane extends up over the embankment to assuree that the liquid does not leak around the edge of the geomembrane.

The liquid 16 is placed in the impoundment. The measuring apparatus of the present disclosure is identified generally by the numeral 20. This measuring apparatus includes a first isolated column 22. The column stands the height of the impoundment and extends thereabove slightly. The column can be circular or rectangular. The cross section of the column is not particularly important other than to note that it holds the liquid in the impoundment. Moreover, the column is isolated in that it is a completely closed member. When it is originally placed in the impoundment, by means of a siphon, the level of liquid in the column 22 is made equal to the level of liquid surface 18. The numeral 24 identifies a second and substantially similar column also placed in the impoundment 10 except that second column 24 is not totally isolated from liquid 16 in the impoundment. The liquid in the two columns is initially leveled to the same level. If desired, they are equal in cross sectional area but this is not mandatory. They are exposed to similar surface conditions. Thus, they are equally shaded or exposed to the sun through the day. They are exposed to equal rates of surface evaporation loss. The two columns are preferably placed side by side so that they are exposed to the same conditions in the impoundment. Thus, as liquid losses occur through evaporation aided and assisted by variations in the wind, the height of the liquid in the two columns will fall together. Because the second column is connected by flow pipe 30 to the liquid impoundment, this second column is subject to level changes caused by liquid losses in the impoundment other than those caused by surface evaporation. The function of the second column containment is to provide stilling of the liquid volume in the second column which is equivalent to that in the first column.

Baffle plates are included at 26 and 28. The baffle plates are included to dampen agitation of the liquid in the two columns. They do not restrict fluid flow; rather, they restrict movement so that the liquid in the two columns is substantially stationary.

The column 24 opens into the impoundment 10 through a filter pipe 30. The pipe 30 introduces liquid into the column 24. The pipe 30 is located some distance below the surface to assure that it does not introduce fluctuations based on wave action. This enables the height of the liquid in the column 24 to fall and maintain parity with the liquid level height in the impoundment 10. As shown in FIG. 1, the column 22, being isolated from the rest of the impoundment, has a surface level at 32, this being exaggerated for purposes of illustration to show the difference in height between the surface 18 and the surface 32.

As described to this point, the two columns are initially leveled on a particular date and at a particular time. Thereafter, surface evaporation may occur. This reduces the total quantity of liquid in the impoundment. However, when this does occur, it should effect the isolated first column 22 and impoundment 10 equally because they are exposed to duplicate circumstances. The rate of evaporative loss is a function of the exposed area. Thus, although the liquid surface exposed in the impoundment 10 and second column 24 is together much greater than the liquid surface exposed in first column 22, the losses will scale by area, resulting in equal level losses from both columns.

Since the second column is connected to the impoundment, its level will fall to the same level as the impoundment. If the impoundment is losing liquid solely by evaporation and other surface losses, then the levels 18 and 32 will fall equally. That is because the losses are only surface losses. If there is a leak, the level of the impoundment will fall more rapidly because this constitutes an additional loss. In other words, the liquid level at 32 will be higher after the passage of some amount of time. It will be higher because it does not lose liquid as a result of the leak.

This system in conjunction with the means 40 connected between the two columns then indicates difference in liquid level height. The means 40 will be discussed and described in review of FIG. 2 of the drawings. This is a mechanism for measuring the difference in liquid level height where those differences are quite small.

Figure 2:
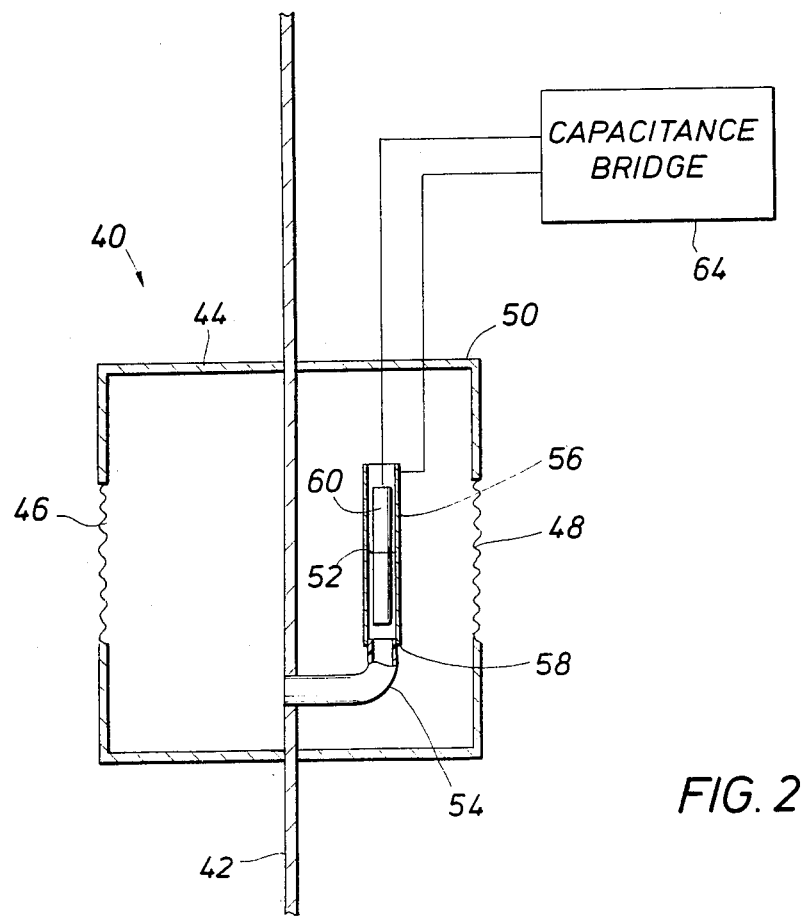
FIG. 2 is an enlarged detailed view of the isolated chambers and capacitor means shown in FIG. 1.

The structure of FIG. 2 includes the supporting wall 42 which supports the means 40. It can be a common wall between the two columns; alternatively, it can be another structural support member so long as fluid pressures are coupled to the means 40 as will be described. The supporting wall 42 supports a first chamber 44. The first chamber is filled with a first liquid. This chamber has a window in it which is closed by a compliant diaphragm 46. This diaphragm is coupled to the isolated liquid column 22. The diaphragm can open directly into the column 22, or alternatively, can be connected thereto by means of a pipe or other conduit. The numeral 48 identifies a similar compliant diaphragm on the opposite side of the wall 42 and it opens into a chamber 50. The chamber 50 holds a second fluid. Again, the diaphragm 48 opens into a second column 24. The diaphragms 46 and 48 can be directly coupled into the two columns as illustrated or can be remote therfrom so long as they are coupled through dedicated conduits to the two columns. As the height of liquid in each column varies, that varies the pressure acting on the two respective diaphragms. The diaphragms couple the pressure from the outside to the liquid on the inside of the two chambers. The two chambers are in turn connected by tube 54. Tube 54 has two exits, one in the lower portion of chamber 44, and the other pointing upwards in chamber 50.

The two chambers 44 and 50 are filled with two different liquids. The liquid in the chamber 44 is preferably heavier or more dense than the liquid in the chamber 50. Secondly, the two liquids are not miscible. Thirdly, they have different dielectric constants. The differences in density and the fact that the liquids are not miscible forms a two liquid interface 52. The interface 52 will rise or fall in connecting tube 54. The pressures exerted by the liquids in columns 22 and 24 affect the liquids in chambers 44 and 50, causing the interface 52 to rise to a certain height within tube 54. The two liquids define the interface but do not mingle. The interface 52 is formed adjacent to a capacitor 56 formed in and around the tube 54. Th capacitor is made of two coaxial plates. One plate 58 is connected to the surface of the tube 54. It is cylindrical and concentric around the second plate 60. The plate 60 consists of a solid mandrel within the tube 54. The two tubes are concentric, thereby defining a narrow gap between the two. The relative cross sectional area of the gap is small compared with the cross sectional area of the tube 54. This serves as a multiplying factor to enhance movement of the interface 52. The two liquid interface may rise and fall only slightly in ordinary circumstances. However, since the cross sectional area defined between the gap of the mandrel 60 and the surrounding tube 54 is only a fraction of the potential cross sectional area, this causes the two liquid interface to move in an exaggerated manner in response to the pressures acting on diaphragms 46 and 48.

Recall that the mandrel 60 serves as the second plate of the capacitor. The two plate system has a capacitance determined by the dielectric constant of the liquid between the two plates. The dielectric constant is not fixed, but depends on the dielectric values of the two liquids within chambers 44 and 50. The overall dielectric constant therefore changes with the location of the interface 52. For this reason, the chosen liquids have different dielectric constants. Thus, the capacitance value depends on the location of the interface 52. As it moves from one extremity to the other depending on fluctuations in the level of liquid in columns 22 and 24, it changes the value of the capacitor between maximum and minimum values.

The two plates of the capacitor connect to a capacitance bridge 64 which measures the value of the capacitor. A high accuracy bridge is used because the fluctuations in capacitance are relatively small. A bridge system is preferably used to assure highly accurate measurements.

The device operates in the following manner. Recall the description above which describes how the liquid level of column 22 achieves a different height in contrast with liquid level height in the second column 24. As these variations in height occur, they are coupled through the respective diaphragms 46 and 48. This changes the internal pressures within the two chambers 44 and 50. In the event that evaporation causes the liquid level to fall equally in both columns, the relative pressure observed at the two compliant diaphragms 46 and 48 is the same. This drop in pressure (an equal loss of liquid head at both columns) leaves the interface 52 at the same location. That is, the two liquid interface does not move up or down in that event. On the other hand, should the impoundment lose liquid due to a leak, the level of liquid in the second column will fall further than the level in the first column. This will cause a relative pressure difference to arise between chamber 44 and 50. When this occurs, the interface 52 moves up around capacitor 56. That is, the chamber 44 is inflicted with slightly greater internal pressure because a taller column of liquid is impinging on it at the diaphragm 46. By contrast, the pressure at the diaphragm 48 in the chamber 50 is relatively less because the column of fluid which defines that pressure is shorter by some measure. This pressure gradient raises the interface 52 between the capacitor plates. That changes the measured capacitance at the bridge 64. This causes the bridge capacitance change to reflect the liquid level height change. Capacitance can be calibrated to reflect changes in difference of the height of liquid in the two columns. This difference in height can then be used to indicate leakage from the impoundment 10.

Assume that a first reading is taken at the time the two columns are filled. This will establish a zero or reference point. When this occurs, the two liquid interface 52 is at a certain location and provides a measured capacitance. Assume that it is then measured again some period of time later. This will provide a second value. Notwithstanding surface losses during that interval, if the capacitance is different, this is indicative of liquid loss. Difference in elevation can be converted to total volumetric loss. For instance, if the two columns of liquid fall precisely the same, all loss is by means of evaporation. That factor is thus eliminated from consideratiton. If the liquid in the impoundment 10 is leaking, that can be evaluated. This can be done even if the impoundment is relative large in surface area. Consider as an example an impoundment which has a surface area of 100,000 square meters. Assume further that the two columns of liquid are measured by the means 40 and it is determined that they have varied in height by ten micrometers. Where there might be an evaporation loss 1,000 fold greater than leakage loss, the ten micrometers indicates that one cubic meter of liquid has been lost. If these measurements are taken 30 days apart, that yields a rate of leakage. Of course, data points can be measured more often. By contrast, if the impoundment has a surface area of 1,000 square meters, a drop in level of 1,000 micrometers would produce a loss of one cubic meter. Again, the measurements can be taken at timed intervals to obtain a rate of loss.

Examples of separate fluids which are not miscible are oil and water. Waer is heavier and thus is placed in the chamber 44 to define the interface 52. Oil is lighter and is placed in the chamber 50. The travel of the two liquid interface 52 is enhanced by blocking off the tube 54 with the insert 60 which defines the coaxial capacitor. If, for instance, the insert physically blocks 90 percent of the cross sectional area on the interior of the tube 54, this serves as a ten-fold multiplier in the range of movement of the interface 52. In other words, the interface is deflected through a greater range.

In operation, the present apparatus incorporates the isolated column which is subject to evaporative loss. While the evaporative or surface losses can be small or quite large, they impact equally on the two columns and the impoundment. The difference in the liquid level 32 shown in FIG. 1 is achieved over a period of time as the liquid escapes through the leak 14. This signifies that a leak is present and suggests that a careful inspection of the impoundment or geomembrane be made to locate the leak and to implement repairs.

While the foregoing is directed to the preferred embodiment, the scope of the present disclosure is determined by the claims which follow.

What is claimed is:

1. An apparatus for determining loss of impounded liquid through a leak in an impoundment, said apparatus comprising:
   a first column in said impoundment, filled with said liquid, having an open upper end, said upper end rising above the liquid level in said impoundment; and
   means for measuring the difference in height of said liquid in said first column and said liquid in said impoundment, said measuring means comprising:
   (a) a first chamber having a first liquid therein;
   (b) a second chamber having a second liquid therein;
   (c) wherein said first and second liquids are:
     (1) not miscible;
     (2) different in dielectric constant; and
     (3) different in density;
   (d) means connecting said first and second chambers together to receive said first and second liquids in contact at a two liquid interface; and
   (e) means communicating said first and second chambers to said first column and said impoundment, respectively, whereby said difference in said liquid level heights results in deflection of said two liquid interface.

2. The apparatus of claim 1 wherein said first column includes means for eliminating liquid agitation below the surface of liquid therein.

3. The apparatus of claim 1 including means for measuring said deflection of said two liquid interface.

4. The apparatus of claim 3 wherein said deflection measuring means measures capcitance across a capacitor having said two liquid interface between plates of said capacitor.

5. The apparatus of claim 4 wherein said capacitor comprises first and second concentric plates spaced apart to admit liquid therebetween.

6. The apparatus of claim 1 including a coaxial capacitor defined by two plates and separated by space therebetween, said capacitor being positioned so that the two liquid interface is located between the plates of said capacitor.

7. The apparatus of claim 6 wherein said capacitor plates are elongate cylindrical plates, one plate comprising a two ended tube connected to said two chambers.

8. The apparatus of claim 1 further comprising a second column in said impoundment, said second columns being in fluid communication with said impoundment, wherein said communication means communicates said second chamber to said second column.

9. The apparatus of claim 8 wherein said columns are adjacent to one another, sharing a common wall, and said measuring means is supported by said common wall.

10. An apparatus for measuring leakage of an impounded liquid from an impoundment comprising:
a first column placed within said impoundment, filled with said impounded liquid to a height equal to the initial height of said impounded liquid in said impoundment;
a second column placed within said impoundment in fluid communication with said impoundment;
means for measuring the difference between said height of said impounded liquid in said first column and the height of said impounded liquid in said second column, said measuring means comprising:
a first chamber having a first measuring liquid therein, the pressure within said first chamber being responsive to said height of said impounded liquid in said first column;
a second chamber having a second measuring liquid therein, the pressure within said second chamber being responsive to said height of said impounded liquid in said second column;
said first and second measuring liquids having different densities, and not miscible;
means fluidly communicating said first and second chambers whereby an interface is formed between said first and second measuring liquids; and
means for correlating the height of said interface to said difference between said height of said impounded liquid in said first column and said height of said impounded liquid in said second column.

11. The apparatus of claim 10 wherein said first and second measuring liquids have different dielectric constants, said first measuring liquid is more dense than said second measuring liquid, and said correlation means comprises:
a connecting tube having open ends, the lower end communicating with said first chamber and the upper end communicating with said second chamber whereby said interface is formed within a vertical portion of said connecting tube;
a capacitor attached to said tube having first and second plates, said interface lying between said plates, whereby deflection of said interface results in a change of the capacitance of said capacitor; and
a capacitor bridge for measuring said capacitance of said capacitor.

12. The apparatus of claim 11 wherein said first plate of said capacitor is cylindrical and integral with said tube, and said second plate is a cylindrical mandrel concentric with and lying inside of said first plate.

13. The apparatus of claim 12 wherein the cross-sectional area of said mandrel is slightly less than the inside diameter of said tube, whereby deflection of said interface within said tube is greatly exaggerated.

14. The apparatus of claim 13 wherein said first and second columns have baffles near the surface of said impounded liquid.

15. The apparatus of claim 10 wherein said first and second columns have baffles near the surface of said impounded liquid.

16. The apparatus of claim 10 wherein said pressures of said first and second chambers are responsive to said heights of said first and second columns, respectively, by means of two nonpermeable diaphragms.

* * * * *